(No Model.)
T. W. JEFFRIES.
ATTACHMENT FOR WEIGHING INSTRUMENTS.
No. 426,818. Patented Apr. 29, 1890.
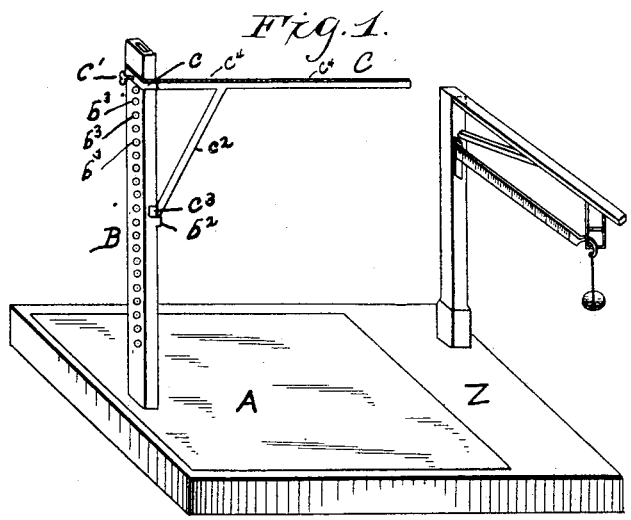
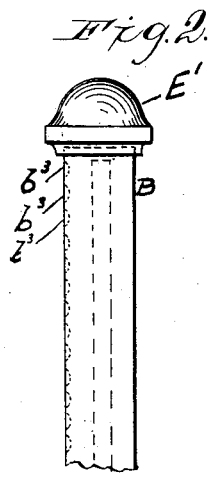
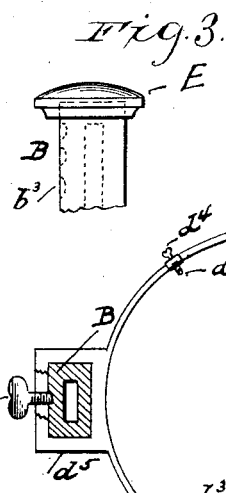
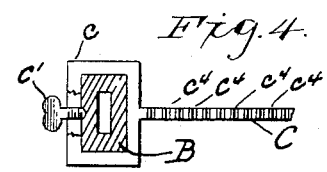
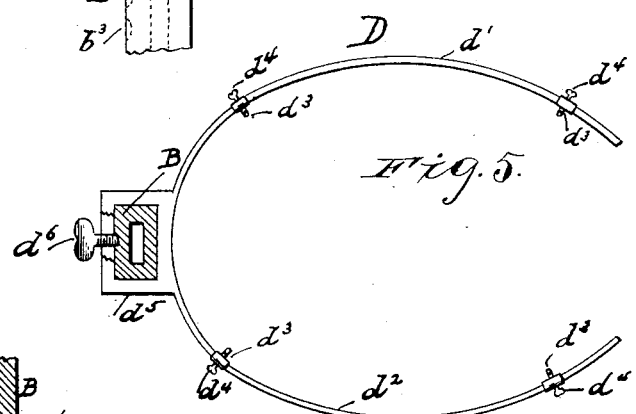
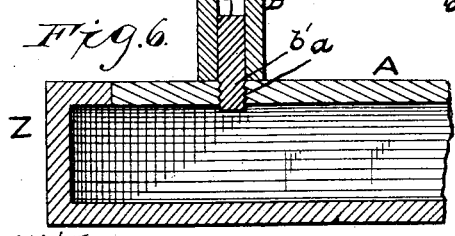
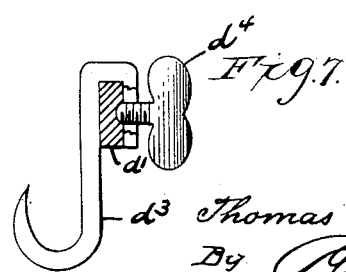
Witnesses:
Inventor
Thomas W. Jeffries
By Richards &
Attorneys.

UNITED STATES PATENT OFFICE.

THOMAS WALTER JEFFRIES, OF SYDNEY, NEW SOUTH WALES.

ATTACHMENT FOR WEIGHING-INSTRUMENTS.

SPECIFICATION forming part of Letters Patent No. 426,818, dated April 29, 1890.

Application filed May 17, 1889. Serial No. 311,159. (No model.)

*To all whom it may concern:*

Be it known that I, THOMAS WALTER JEFFRIES, a subject of Her Majesty the Queen of Great Britain and Ireland, and a resident of Sydney, in the Colony of New South Wales, have invented a certain new and useful Improvement in Attachments for Weighing-Instruments, of which the following is a full, clear, and exact description.

It is a well-recognized fact that in the use of platform and other scales and weighing-instruments in the weighing of miscellaneous merchandise the platforms become very dirty and often thickly coated with particles of the various articles weighed. This is particularly true where meats or other articles of a greasy or moist nature are weighed. In such cases it frequently happens that the working parts of the scales become clogged with foreign matters, so that they do not weigh correctly, while the articles weighed are more or less fouled and contaminated by being placed upon the dirty platforms. Various expedients have been resorted to to prevent such results, such as covering the platforms with cloths or burlaps or with wooden boards; but as these articles become dirty very quickly the desired result is not attained.

The object of my invention is to provide an attachment for scales for supporting goods while they are being weighed and in such a manner that neither the goods nor the scales can become fouled or dirty or the proper working of the scales be interfered with.

In the accompanying drawings, which illustrate my invention and which form a part of this specification, Figure 1 is a perspective view showing a platform-scale provided with my attachment for supporting meats and other articles. Figs. 2 and 3 are partial detail views of my goods-supporting standard, showing the application of my system of counter-weights. Fig. 4 is a detail view, partly in section, showing a portion of the goods-supporting arm and the manner of its attachment to the standard. Fig. 5 is a plan view of my improved bag-holder, also showing the manner in which it may be attached to the standard. Fig. 6 is a partial sectional view of the frame of a scale with its weighing-platform, showing the manner in which the standard may be secured to the platform. Fig. 7 is a detail view of one of the bag-holder hooks.

Similar letters of reference indicate corresponding parts wherever they occur.

My invention is applicable to all weighing-instruments which are provided with a platform or equivalent means for supporting the articles to be weighed, and may be attached to all weighing-instruments now in use, as well as to new ones, and with equal facility.

I will now proceed to describe my invention as applied to the ordinary platform-scales.

In the rear and center of the weighing-platform A of the scales Z, I tap a recess or seat $a$, provided with a female screw, and upon the platform A, I erect standard or post B. This standard B may be constructed of any suitable material, and may be of any desired form. I prefer, however, to construct it of iron and to make it hollow in order to economize in weight as much as possible. In the bottom of the standard B, I drive a plug $b$, Fig. 6, also preferably of iron, the lower end $b'$ of which plug or projection $b$ is constructed of a suitable size and screw-threaded, so that it may engage with the female screw with which the seat $a$ is provided, formed in the platform A of the scales. The standard B may then be readily screwed down firmly onto the platform A, and may be as readily removed when desired. I do not confine myself to this mode of fastening the standard, as any other method which will support the standard in place will answer as well. I have, however, found this manner of securing the standard in place to answer the purpose well.

The standard B may be of any suitable height, and its height should vary with the size of the scale to be used and the articles to be weighed. It should, however, in all cases be high enough to hold the goods to be weighed above and away from the platform when they are suspended from the standard, in the manner hereinafter explained.

Upon the standard B, I attach an arm or steelyard C by means of a sleeve or collar $c$, which may be formed on or attached to the arm C in any well-known manner. The collar $c$ is constructed of the same shape in cross-section and a little larger than the standard B, so that it will slip down over and embrace the same, and, being secured in place by the set-screw $c'$, support the arm C at right angles to the standard B. To further support the arm C, I construct it with a brace $c^2$, the lower end of which is formed with a half-collar $c^3$, which rests against the side of the standard B and upon a lug or projection $b^2$, formed on the side of said standard.

The arm C extends outwardly from and at right angles to the standard B, and preferably over the platform of the scales, and articles to be weighed may be hung upon it by means of hooks or otherwise. To facilitate the hanging of goods thereon and to prevent their slipping off, I prefer to form the upper edge of the arm C with a series of notches $c^4$, which extend throughout the entire length of the arm.

When it is desired to weigh a larger number of articles than can be readily hung on a single arm, a number of such arms, as C, may be attached to the standard B by arranging the arms at different heights, so that the collars on the standard will not interfere with each other, and the arms may radiate outward from the standard as a center and in different directions.

In order to secure the collar $c$ firmly in place I provide notches or depressions $b^3$ a short distance apart down the back of the standard B, and the set-screw $c'$ may be screwed into one of these.

For weighing grain or flour or any other articles which are ordinarily or preferably weighed in bags, I remove the arm C from the standard B and attach a bag-holder D in place thereof. The bag-holder D is preferably formed of a band or strip of metal bent in an approximately oval shape. The band or strip need not be bent around sufficiently so that their ends join. Indeed I prefer that the ends should not be joined, but that they should remain free, forming two independent arms $d'$ $d^2$, as shown in Fig. 5. Upon these arms $d'$ $d^2$ hooks $d^3$ may be placed. The upper ends of these hooks I form in the shape of an inverted U, so that they may be attached to the arms $d'$ $d^2$ of the bag-holder by simply hanging them on the said arms, which they are made to fit, when they may be secured firmly in place by a set-screw $d^4$. In this way I may use any number of hooks upon the bag-holder, placing them nearer together or farther apart, as desired.

The bag-holder D is provided with a collar $d^5$, and is attached to the standard B with a set-screw $d^6$ in the same manner as the arm C. Inasmuch as the bag-holder D is usually considerably lighter than the arm C, and as it is desirable that my attachment should always be of the same weight for convenience in computing the weight of the articles weighed, I ascertain the exact difference between the weight of each arm C and its accompanying bag-holder D and construct a weight, as E, which exactly equals such difference, and when using the bag-holder (the arm C having been removed) I place this weight E upon the top of the standard B, Fig. 3. For this purpose the under side of the weight E is made of a shape to fit the top of the standard.

When it is desired to use the scales without either the arm C or the bag-holder D, the standard B being allowed to remain on the platform of the scales, I construct a weight E' of the exact weight of the arm C and place this upon the top of the standard B, the weight being constructed to exactly fit the same. By using these weights the weigher need only deduct the known weight of the standard B and the arm C from the gross weight of the articles to arrive at the net weight, or by making proper allowance and provision for such weight in the arrangement of the weights on the weighing-arm of the scales the index on the weighing-arm will tell the correct weight of the articles.

By the use of my attachment a greater number of articles may be weighed at the same time than has heretofore been possible, and both the scales and the articles to be weighed may be kept in a perfectly cleanly condition.

When the bag-holder is used, my attachment presents another important advantage, for, as the mouth of the bag is held open by the hooks $d^3$, upon which the bag is supported, one man can easily attend to the filling, weighing, and tying of the bag—a work usually requiring the services of two men. A further advantage is, that the bag-holder may be adjusted and fastened at any desired height on the standard B, so as to accommodate all sizes of bags, and, as the mouth of the bag is held open to the constant inspection of the weigher, he is able to stop the feeding of the grain or other articles at the exact moment the desired weight of material has been fed into the bag.

Having now described my invention, what I claim as new, and desire to secure by Letters Patent, is—

1. The combination, with the platform of a weighing-machine provided with a seat, of the standard B, fitting said seat and adapted to be held thereby in an erect position, and a horizontal arm attached to said standard and adapted for the suspension of goods to be weighed, substantially as set forth.

2. A goods-holder for a weighing-instrument, supported upon the weighing-platform of said instrument, and having a horizontal suspension arm or arms upon which the goods to be weighed may be hung, substantially as shown and described.

3. A goods-holder for a weighing-instrument, comprising a standard B, adapted to be rigidly attached to the weighing-platform of said instrument by means of a recess and a projection fitting therein, and having an arm or arms for supporting the goods to be weighed, and means for adjustably securing the arm or arms in position, substantially as shown and described.

4. The combination, with the platform of a weighing-instrument, of a standard, as B, secured to said platform, its arm, as C, said arm being provided with a brace, as $c^2$, and devices for attaching said arm to the said standard, substantially as shown and described.

5. The combination, with the platform of a weighing-instrument, of a standard secured to said platform, detachable goods-supporting devices arranged thereon, and a counter-weight equal in gravity to said devices and adapted to be placed on the top of said standard, all constructed and arranged to operate substantially as shown and described.

6. In a goods-supporting device for weighing-instruments, constructed and adapted to operate substantially as hereinbefore described, the combination of a standard, as B, and an arm C for holding goods, said arm being provided with a collar, as $c$, and with a set-screw for holding the collars in place upon said standard, substantially as shown and described.

7. In a goods-supporting device for weighing-instruments, the combination of a standard B, an arm C, provided with a collar, as $c$, and a set-screw, as $c'$, said arm being provided with a series of notches, as $c^4$, upon its upper side, substantially as shown and described.

8. In a goods-supporting device for weighing-instruments, the combination, with the weighing-platform, as A, said platform being tapped with a female screw, as $a$, of a standard, as B, carrying the goods-supporting arms, said standard being provided with a plug, as $b$, the shank $b'$ of which is screw-threaded and adapted to engage with the female screw $a$ of the platform A, substantially as shown and described.

9. In a goods-supporting device for weighing-instruments, the combination, with the weighing-platform, as A, of a standard, as B, having the lug or projection, as $b^2$, and an arm, as C, constructed with a collar and set-screw, as $c\ c'$, and with a brace, as $c^2$, and half-collar, as $c^3$, substantially as shown and described.

In witness whereof I have hereunto set my hand in presence of two witnesses.

THOMAS WALTER JEFFRIES.

Witnesses:
T. GUY SONGSTER,
WM. W. PALMER.